United States Patent [19]
Jennings et al.

[11] Patent Number: 5,633,969
[45] Date of Patent: May 27, 1997

[54] AUTOMOTIVE FIBER OPTIC CABLE SPLICE

[75] Inventors: Kurt L. Jennings, Warren; James R. Cirillo, Youngstown; John L. Jablonski, Masury, all of Ohio

[73] Assignee: General Motors Corporation, Detroit, Mich.

[21] Appl. No.: 534,366

[22] Filed: Sep. 27, 1995

[51] Int. Cl.$^6$ .................................................. G02B 6/38
[52] U.S. Cl. ........................... 385/62; 385/69; 385/60; 385/70; 385/99
[58] Field of Search .................. 385/56, 60, 62, 385/69, 70, 72, 78, 81, 86, 87, 99, 136

[56] References Cited

U.S. PATENT DOCUMENTS

| | | | |
|---|---|---|---|
| 4,787,701 | 11/1988 | Stenger et al. | 385/60 |
| 5,239,604 | 8/1993 | Zeibol et al. | 385/72 |

FOREIGN PATENT DOCUMENTS

| | | | |
|---|---|---|---|
| 2020056 | 11/1979 | United Kingdom | 385/69 |
| 2058392 | 4/1981 | United Kingdom | 385/60 |
| 2086602 | 5/1982 | United Kingdom | 385/62 |
| 2201009 | 8/1988 | United Kingdom | 385/62 |

*Primary Examiner*—Rodney B. Bovernick
*Assistant Examiner*—Luong-Quyen Phan
*Attorney, Agent, or Firm*—Ernest E. Helms

[57] ABSTRACT

An automotive fiber optic cable splice for connecting first and second fiber optic cables in an abutting connection is provided. The splice includes a casing with first and second ends, the casing encircling the first and second fiber optic cables; first and second end caps generally at the first and second ends of the casing; first and second ferrules positioned within the casing for aligning the first and second fiber optic cables generally adjacent the abutting connection of the first and second fiber optic cables; first and second crimps radially gripping the first and second fiber optic cables, respectively, creating on each fiber optic cable a crimped region thereon; and first and second seals radially sealing the fiber optic cables and sealing the fiber optic cables within the casing adjacent the respective first and second end caps, the first and second seals biasing the first and second fiber optic cables toward one another.

13 Claims, 3 Drawing Sheets

AUTOMOTIVE FIBER OPTIC CABLE SPLICE

FIELD OF THE INVENTION

The field of the present invention is that of fiber optic splices or connections, and more particularly, fiber optic connections for plastic fiber optic cable.

BACKGROUND OF THE INVENTION

As more electronics are used in automobiles, it is now common to allow signals for various electronic components to be transmitted over a single cable. As frequencies of electronic signals are increased, an undesirable phenomenon of electromagnetic radiation emanates from the cable, requiring the utilization of electromagnetic shielding. To alleviate the need for electromagnetic shielding and high frequency signal transmission, fiber optic cables have been utilized.

There are two major types of fiber optic cables. One type is a glass fiber which typically is unacceptable for automotive use due to routing requirements and cost. To allow for the use of fiber optic cable in an automotive environment, typically a plastic cable formed from polymethyl methacrylate (PMMA) has been developed by various companies. In addition, when using fiber optics in automobiles, splices must be utilized at various positions to allow the various components of the automobile to be assembled in a normal manner.

SUMMARY OF THE INVENTION

The present invention provides an optical splice ideally suited for the utilization of plastic fiber optic cable which is inexpensive, provides accurate location in the connection interface between the abutting cables, is durable, is easy to assemble in an automotive assembly environment and is capable of withstanding the environmental conditions frequently found within both passenger and engine compartments of an automobile.

DESCRIPTION OF THE PREFERRED EMBODIMENT

Figure 1:
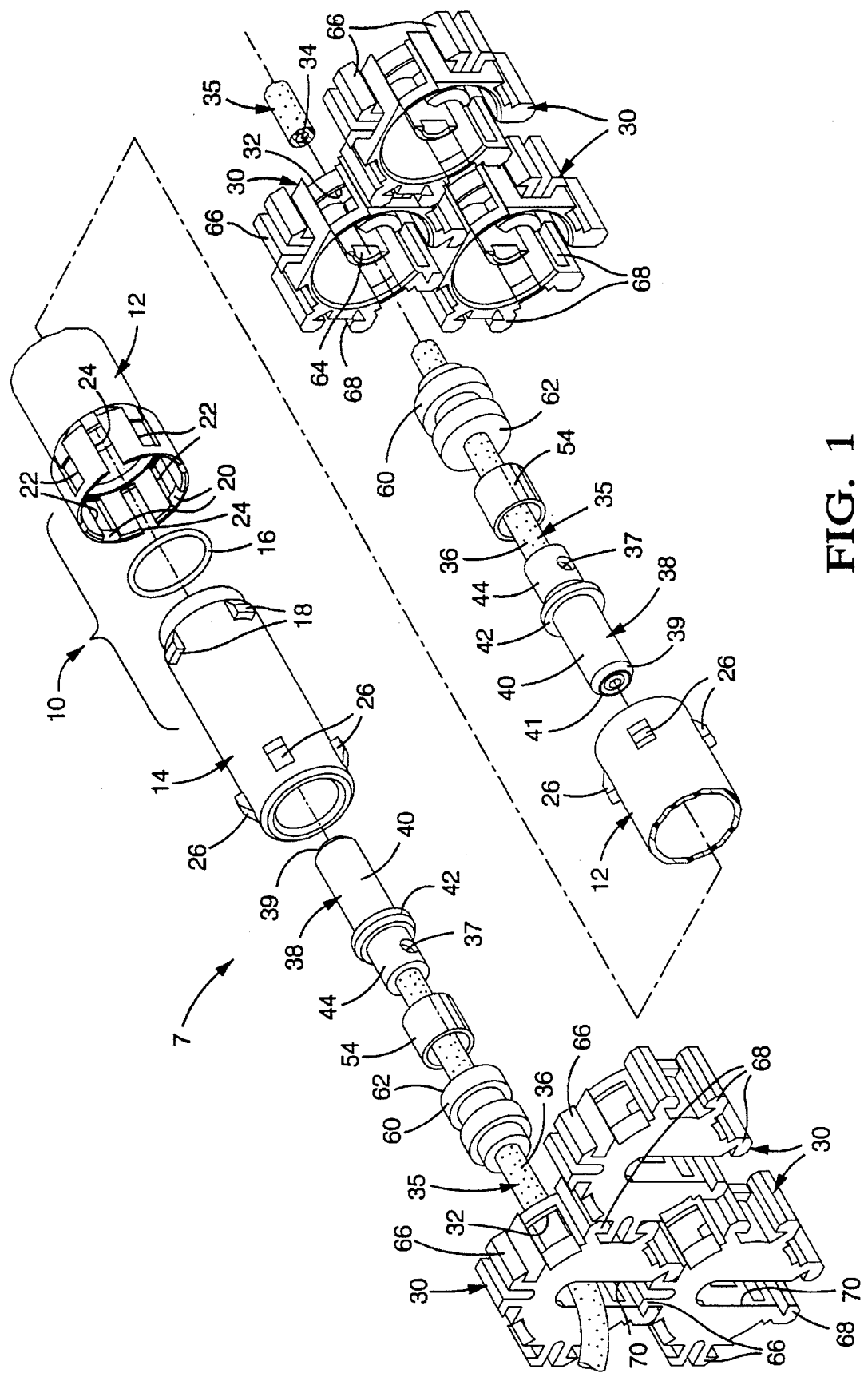
FIG. 1 is an exploded view of a preferred embodiment fiber optic cable splice according to the present invention.
Figure 2:
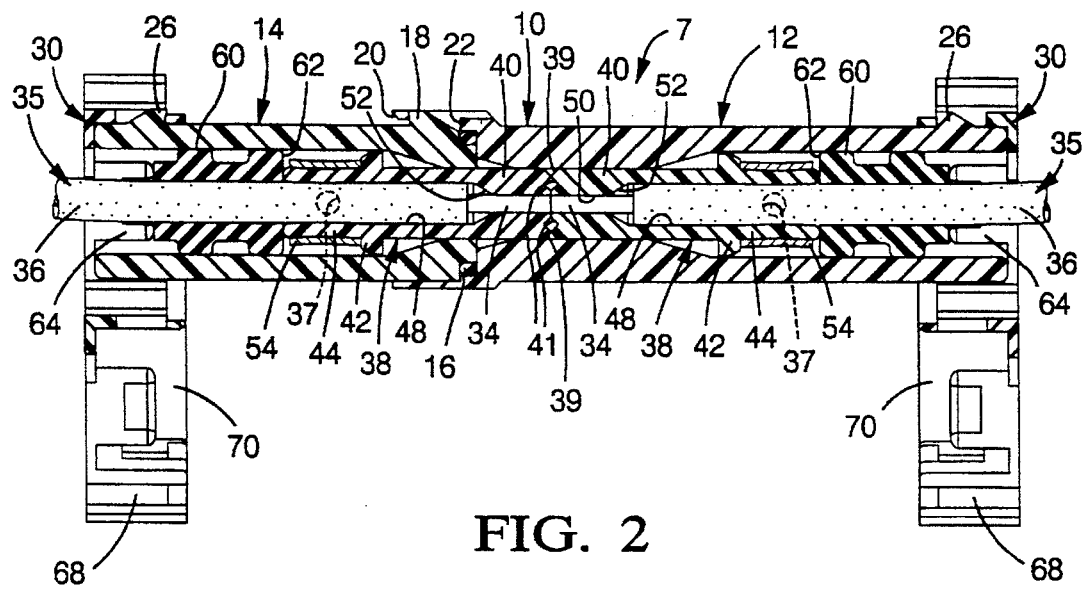
FIG. 2 is an assembled sectional view of the fiber optic splice shown in FIG. 1.

Referring to FIGS. 1 and 2, the cable splice 7 according to the present invention has a multiple piece casing 10 formed from a long casing member 12 and a short casing member 14. The casing members 12 and 14 have an O-ring 16 juxtaposed therebetween for sealing purposes. Casing member 14 has a series of geometrically spaced protrusions 18 which are guided by inclined surfaces 20 of a long casing member to such a point that they enter elongated closed slots 22 to provide a snap fit connection. Open slots 24 are provided to allow for the long casing member 12 to expand upon the snap fit connection. Typically, both casings 12 and 14 will be made from a nylon-based plastic material or other suitable alternatives. Both the short 14 and long 12 casing members have protrusions 26 similar to that of 18 for snap fit connection within respective end caps 30 at their outer ends. The protrusions 26 fit within closed slots 32 of the end caps.

The fiber optic cable 35 typically has a core 34 formed from an acrylic-based plastic having good optical properties. The core 34 is surrounded by a thin cladding (not shown). Together, the core 34 and thin cladding form what is referred to as an "optical fiber." In most applications, the optical fiber is then jacketed to provide more robust handling. Typical diameters of the core 34 are between 0.25 mm and 2 mm for signal transfer application. Larger core sizes of up to 12 mm are more common with optical lighting systems. The most common fiber size is a core outer diameter of 1 mm with a 2.2 mm outer diameter when jacketed.

The core 34 as utilized herein may or may not be an actual organic or inorganic fibrous matter add typically has a solid cross-sectional area. The optical fiber 34 is jacketed by a sheath 36 made from a polyethylene material, typically 0.6 mm thick with an outer diameter of 2.2 mm.

To help align the optical fiber 34 within the splice 7, there is a ferrule 38. The ferrule 38 is made from a nylon-based material. The ferrule 38 has a nose 40 connected to a flange area 42 followed by a crimping neck 44. The ferrule crimping neck 44 has a radial bore 37. The bore 37 provides for increased retention of the ferrule 38 on the jacketed optical fiber when the ferrule 38 is crimped on. The polyethylene sheath 36 flows into the bore 37 when compressed. The ferrule 38 has a multi-dimensional bore having a large section 48 tapered down to a smaller diameter section 50. The smaller diameter section 50 has a 0.10 clearance with the optical fiber 34. The larger diameter section 48 has a 0.15 mm elegance with the sheath 36. The end of the sheath 36 terminates before the end 52 of the ferrule enlarged inner diameter 48 to ensure that the optical fiber 34 may freely be urged forwardly.

The ferrule 38 has at its tip an outer groove 39 which is used for alignment when the ferrule is mated to an optical device such as a light emitting diode (LED) (not shown) or an optical receiver (not shown). Additionally, an inner reservoir groove 41 is provided for excess reflow fiber material for reasons best explained by a review of U.S. Pat. No. 5,097,522, commonly assigned.

A crimp ring 54 made from a malleable, crimpable metal material has a 0.10 mm clearance with the neck region 44 of the ferrule before it is crimped in position by an ample force, causing the ferrule inner diameter 48 to approximate a 0.10 mm interference with the cover 36 of the fiber optic cable. To seal the outer radial diameter of the cover 36 and to seal the fiber optic cable 34 within the housing 10, there is provided a multi-lobe seal 60. The seal at its forward end 62 pushes against the ferrule 38 due to its entrapment by a protrusion 64 formed on the end cap 30. The seal 60 is typically made from silicon rubber or other suitable elastomeric material. The seal 60 typically seals the interior of the casing 10 to 6 psi and pushes with a force of 2.5 lbf. The seal is compressed approximately 1.5 mm to ensure contact between the respective fiber optic cables 35.

The end cap 30, as mentioned previously, snaps onto the casing 10 and also has fingers 66 which interlock into corresponding pockets 68 of corresponding end caps 30 to allow for parallel nesting of various splices 7 together. Additionally, for ease of manufacturing, each end cap 30 has an elongated open slot 70 for threading of the optical fiber.

Figure 4:
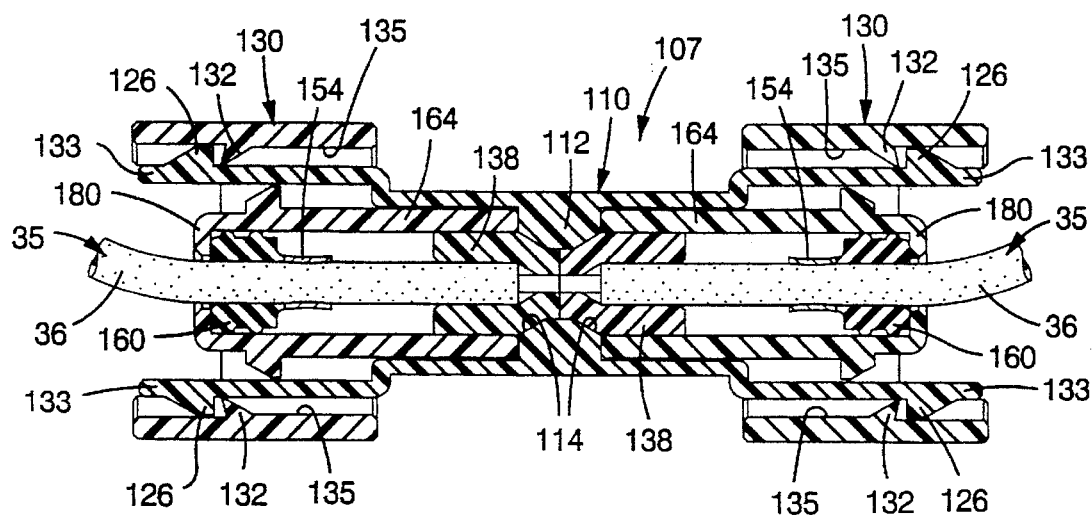
FIG. 4 is an assembled sectional view of the fiber optic cable splice shown in FIG. 3.
Figure 5:
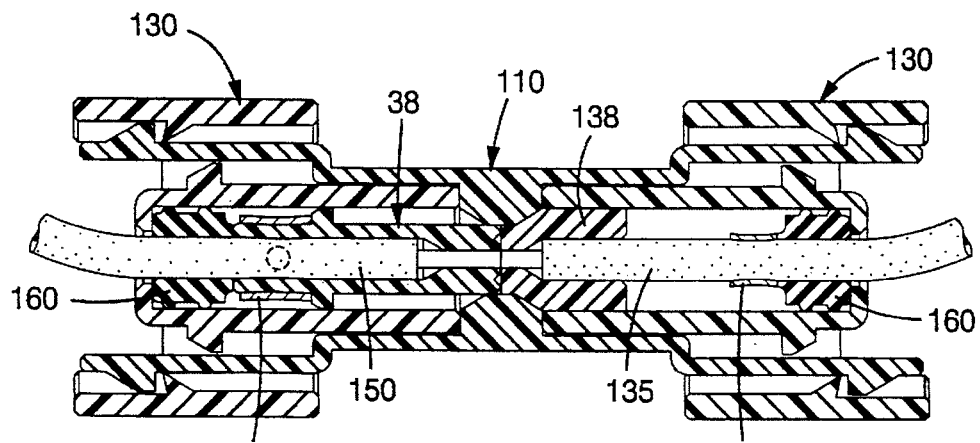
FIG. 5 is an assembled sectional view of an alternate preferred embodiment of the fiber optic cable splice shown in FIGS. 3 and 4.
Figure 3:
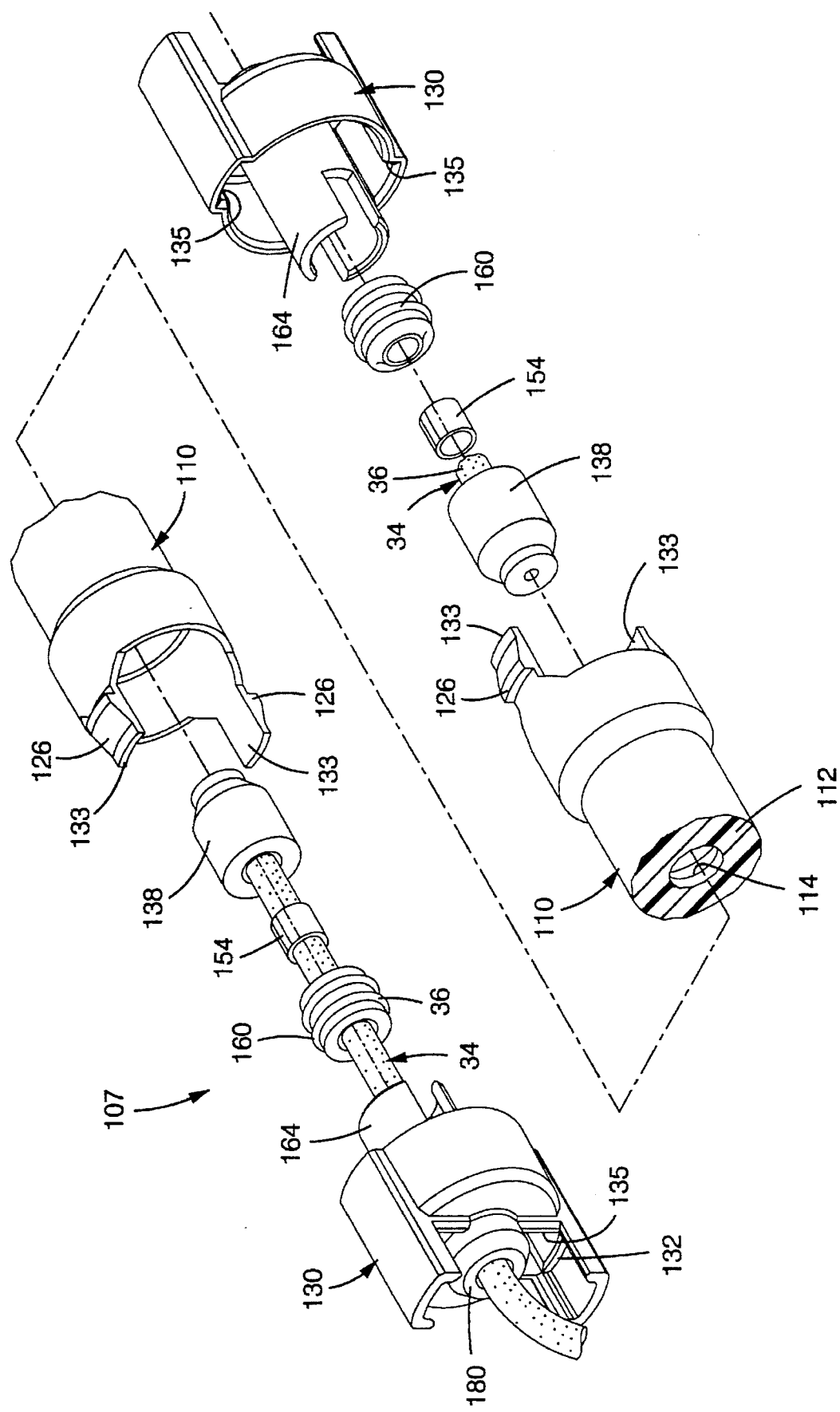
FIG. 3 is an exploded view of an alternate preferred embodiment according to the present invention using a single piece casing instead of the two-piece casing used in the embodiment shown in FIG. 1.

Referring to FIGS. 3 and 4, an alternate preferred embodiment of the present invention 107 has a single piece casing 110. The casing has a central wall or interior facing flange 112 with tapered surfaces 114. Insertable within the casing 110 are two insert ferrules 138. The insert ferrules 138 are limited in their position by the tapered surfaces 114. The end caps 130 have a portion which is inserted within the casing 110 and also surrounds part of the ferrules 138, designated in FIGS. 3 and 4 as 164. The end caps 130 also have an end wall 180 to capture a seal 160 which directly contacts a crimp ring 154 which radially captures the cover 36 of the optical fiber 34. The housing has protrusions 126 which have a snap fit connection with end cap radially inward protrusions 132. The housing 110 tips 133 pass through openings 135 of the end cap when establishing connection.

One of the advantages of the cable splice 107 is that it may be easily adapted in situations where one optical fiber 150 has a flange ferrule 38 while the other fiber 135 has an insert type ferrule 138.

The fiber optic cable splice 7 with the two-piece casing member 10 allows for an operator/user to separately connect short casing member 14 and the end cap 30 onto one optical fiber 35, then connect a long casing member 12 and another end cap 30. Then the two separate fiber-filled connector halves can be connected and/or separated.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A fiber optic cable splice for connecting first and second fiber optic cables in an abutting connection, the splice comprising:

a casing with first and second ends, the casing encircling the first and second fiber optic cables;

first and second end caps generally at the first and second ends of the casing;

first and second ferrules positioned within the casing for aligning the first and second fiber optic cables generally adjacent the abutting connection of the first and second fiber optic cables;

first and second crimps radially gripping the first and second fiber optic cables, respectively, creating on each fiber optic cable a crimped region thereon; and first and second seals radially sealing the fiber optic cables and sealing the fiber optic cables within the casing adjacent the respective first and second end caps, the first and second seals biasing the first and second fiber optic cables toward one another.

2. A fiber optic cable splice as described in claim 1 wherein the casing is made of two separate members.

3. A fiber optic cable splice as described in claim 1 having at least one end cap which snaps on the casing.

4. A fiber optic cable splice as described in claim 3 wherein the end cap may be nested in an end cap of a generally adjacent fiber optic splice.

5. A fiber optic cable splice as described in claim 3 wherein the end cap has a protrusion which inserts into the casing and positions the seal.

6. A fiber optic splice as described in claim 1 wherein the ferrule has a neck region and a flange region generally adjacent the neck region and the ferrule is connected with the fiber optic cable by crimping over the neck region of the ferrule.

7. A fiber optic splice as described in claim 1 wherein at least one of the seals has multiple ridges sealing the fiber optic cable with the casing.

8. A fiber optic cable splice as described in claim 1 wherein at least one of the end caps projects within the casing to position the respective seal.

9. A fiber optic cable splice as described in claim 8 wherein at least one of the end caps also encircles the respective seal.

10. A fiber optic cable splice as described in claim 9 wherein at least one of the end caps also encircles a portion of the respective ferrule.

11. A fiber optic cable splice as described in claim 1 wherein the casing has a central interior wall providing a shoulder which aligns at least one of the ferrules.

12. A fiber optic cable splice for connecting first and second fiber optic cables in an abutting connection, the fiber optic cable splice comprising:

a two-piece casing having first and second outer ends, the casing encircling the first and second fiber optic cables;

first and second snap-on end caps enclosing the first and second ends of the casing;

first and second ferrules crimped onto the respective fiber optic cables and insertable within the casing, the ferrules being generally adjacent the abutting connection of the first and second fiber optic cables, respectively, the first and second ferrules being crimped on the fiber optic cables; and first and second seals juxtaposed between the respective end caps and ferrules radially sealing the fiber optic cable and sealing the fiber optic cable with respect to the casing and urging the respective fiber optic cables toward one another.

13. A fiber optic splice for connecting first and second fiber optic cables in an abutting connection comprising:

a casing with first and second ends encircling the first and second fiber optic cables, the casing having a radially inward directed flange generally adjacent the abutting connection of the first and second fiber optic cables;

first and second ferrules inserted within the casing for aligning the first and second fiber optic cables generally adjacent the abutting connection of the first and second fiber optic cables;

first and second crimps radially gripping the first and second fibers, respectively, creating on the fiber optic cables a crimp region;

first and second seals radially sealing the respective first and second fiber optic cables being adjacent the crimp region of the first and second fiber optic cables, urging the first and second fiber optic cables toward one another; and first and second end caps generally enclosing the first and second ends of the casing, the end caps having a portion generally inserted within the casing and surrounding the seal and aligning the ferrules within the casing.

* * * * *